(12) United States Patent
Kneller et al.

(10) Patent No.: US 11,079,302 B2
(45) Date of Patent: Aug. 3, 2021

(54) VACUUM DECAY LEAK DETECTION WITH CORRECTION FOR INTERFERENCES

(71) Applicant: PACKAGING TECHNOLOGIES & INSPECTION, LLC, Hawthorne, NY (US)

(72) Inventors: Mikhail Kneller, Bronx, NY (US); Conroy Brown, Bronx, NY (US); Anton Stauffer, Morges (CH); Oliver Stauffer, Tuckahoe, NY (US)

(73) Assignee: PACKAGING TECHNOLOGIES AND INSPECTION, LLC, Hawthorne, NY (US)

( * ) Notice: Subject to any disclaimer, the term of this patent is extended or adjusted under 35 U.S.C. 154(b) by 402 days.

(21) Appl. No.: 16/097,797

(22) PCT Filed: Aug. 10, 2018

(86) PCT No.: PCT/US2018/046345
§ 371 (c)(1),
(2) Date: Oct. 30, 2018

(87) PCT Pub. No.: WO2020/032978
PCT Pub. Date: Feb. 13, 2020

(65) Prior Publication Data
US 2021/0088406 A1 Mar. 25, 2021

(51) Int. Cl.
*G01M 3/32* (2006.01)
*G01M 3/34* (2006.01)

(52) U.S. Cl.
CPC ........ *G01M 3/3209* (2013.01); *G01M 3/3281* (2013.01); *G01M 3/34* (2013.01)

(58) Field of Classification Search
CPC ..... G01M 3/3209; G01M 3/3281; G01M 3/34
See application file for complete search history.

(56) References Cited

U.S. PATENT DOCUMENTS

| | | | |
|---|---|---|---|
| 4,587,619 A | 5/1986 | Converse, III et al. | |
| 5,513,516 A | * 5/1996 | Stauffer | G01M 3/3218 73/49.2 |
| 5,957,115 A | * 9/1999 | Busato | F02M 25/0809 123/520 |
| 6,513,366 B1 | * 2/2003 | Stauffer | G01M 3/329 73/49.3 |
| 8,544,315 B2 | 10/2013 | Guazzo et al. | |
| 10,401,255 B1 | * 9/2019 | Chamberlain | G01M 3/205 |
| 2019/0339157 A1 | * 11/2019 | Stauffer | G01M 3/26 |

FOREIGN PATENT DOCUMENTS

WO    2018125946 A1    7/2018

* cited by examiner

*Primary Examiner* — Natalie Huls
(74) *Attorney, Agent, or Firm* — Benesch, Friedlander, Coplan & Aronoff LLP

(57) ABSTRACT

The current invention mitigates the problem of incorrect determinations of leaking packages during vacuum decay leak detection testing. As described in this disclosure, a testing chamber used for vacuum decay leak detection testing is exposed to interferences when not under vacuum or at low pressure conditions between testing cycles. By measuring one or more exposure time intervals immediately preceding a present test cycle, it is possible to improve detection of leaking packages by adjusting raw measured pressure gathered during vacuum decay leak testing based upon the length of exposure times and create corrected pressure data used to improve vacuum decay leak detection.

19 Claims, 2 Drawing Sheets

| TEST 1 | |
|---|---|
| DT PREVIOUS | DT CURRENT |
| TIME A | TIME B |

| TEST 2 | |
|---|---|
| DT PREVIOUS | DT CURRENT |
| TIME B | TIME C |

VACUUM DECAY LEAK DETECTION WITH CORRECTION FOR INTERFERENCES

BACKGROUND OF THE INVENTION

Field of the Invention

The present invention is directed to the field of package/container vacuum decay leak detection testing and more particularly to the vacuum decay testing of packages and/or containers filled with either dry product or liquid product such as non-porous vials, ampoules, injection cartridges, ophthalmic product packages, syringes, pouches, blister packages and other packages containing critical medicinal and/or chemical products. Even more specifically, the present invention improves known leak detection methods of measuring vacuum decay within a testing chamber in which a container being tested is sealed within the testing chamber and wherein as a vacuum is being pulled within the testing chamber the pressure levels are continuously monitored using an absolute pressure transducer, or both an absolute pressure transducer and a differential pressure transducer, such that pressure conditions within the testing chamber measured over a period of time are used to indicate whether or not there is a leak in a container being tested. The improvements to this known method involve correcting measured data for the exposure of the testing chamber to interferences during time intervals between testing when the testing chamber is unsealed and not under vacuum or low pressure conditions.

Brief Description of the Related Art

There have been many innovations made with respect to the field of pressure testing of containers, packages, and container and package seals through the use of vacuum decay leak testing. ASTM approved vacuum decay leak test method (F2338) is recognized by the U.S. Food and Drug Administration as a consensus industry standard for package integrity testing. Vacuum decay technology is also referenced in the new USP <1207> Chapter Guidance as a deterministic test method for package integrity testing. However, as with most package seal integrity testing methods and apparatuses, there are intrinsic and extrinsic factors that can influence or alter testing data and ultimately cause incorrect determinations of package seal integrity.

Improvements to the stated standard vacuum decay leak testing systems and methods have been developed to improve testing accuracy. One such improvement is provided in U.S. Pat. No. 8,544,315 to Guazzo ("Guazzo") for an at-rest vacuum state for vacuum decay leak testing method and system, which teaches a test apparatus or system remaining under low pressure or vacuum conditions while leak tests are not actively in progress such that the system is maintained at an at-rest low vacuum condition to minimize pressure sensor drift and to eliminate build-up of vapors or gases within the apparatus or test system between tests. Guazzo seeks in part to eliminate extrinsic factors, such as vapor or gas build-up within the system, in order to provide more accurate vacuum decay leak testing. However, Guazzo does not contemplate eliminating or correcting for intrinsic factors that also contribute to altered testing data, such as stretching of flexible or non-rigid testing chambers, and ultimately incorrect determinations of package seal integrity. Further, Guazzo does not contemplate that such intrinsic factors undermine the improvements taught in Guazzo to eliminate extrinsic factors.

Interferences affecting vacuum decay leak detection methods and systems include ambient air, moisture, stretching of testing chamber material, air pockets, particles, etc. All of these interferences ultimately alter the raw or basic pressure readings within the chamber during testing through altering consistent volume measurement, removing a uniform environment within the testing chamber, or interfering with system sensors. Generally, the pressure readings gathered during testing are more greatly affected the longer the testing chamber is exposed to interferences when the system is not under vacuum or low pressure conditions. However, the rate at which the pressure measurements are affected generally decrease as an idle interval, or a time in which a vacuum decay leak detection testing system is not under vacuum or at low pressure conditions, approaches 300 seconds. Therefore, the impact of interference exposure during idle time intervals between testing can be viewed as either linear or hyperbolic.

Known implementations of vacuum decay leak testing, such as the ASTM standard, and even improvements to vacuum decay testing as providing in Guazzo, include automated accurate measurements of vacuum pressure and change in said vacuum pressure during predetermined and accurately measured test cycle intervals. In all forms of known vacuum decay leak detection testing, and known leak detection systems in general, the testing chamber must at some point return to atmospheric pressure in order to continually swap out tested packages or containers for untested packages or containers. While Guazzo teaches keeping the testing chamber and system under low pressure conditions during the idle times between testing, Guazzo does not teach keeping the system under low pressure conditions as the testing samples are swapped. There are always idle intervals between testing in all known vacuum decay leak detection methods and systems where the testing system and testing chamber are not under vacuum or at low pressure conditions.

Individual idle interval lengths between tests are conventionally not measured or controlled. In the leak detection industry, idle intervals are generally determined by production rate of the fully automated, 100% on-line inspection or operator performance in statistical process control testing. This means that, while the average idle interval time is known over the course of a production cycle, there may be great variance between individual idle time intervals across hundreds or thousands of tests. As vacuum decay leak detection testing makes leak determinations on a test-by-test basis, so too should the effects of idle intervals be considered and evaluated on a test-by-test basis. However, the present invention teaches the first known method and system that does consider individual idle intervals between testing.

While Guazzo teaches a system that maintains low-pressure or vacuum conditions while the system is idle to reduce exposure to gas or vapor build-up, the low-pressure or vacuum conditions must necessarily be eliminated to remove a testing sample and insert a new testing sample. At least for the time of loading and unloading a test sample into and out of the testing chamber, the testing chamber has to be at atmospheric pressure. Any positive effects provided by the idle low-pressure or vacuum conditions at rest are necessarily counteracted, or at least non-existent for the duration of time in which the testing chamber is not at vacuum or low pressure conditions.

Guazzo also does not contemplate the effect that flexible testing chambers have on pressure readings gathered during vacuum decay leak detection testing. While rigid testing chambers must contend with build-up of gases or vapors or other interferences, systems and methods employing flexible testing chambers must also contend with interference from stretching of flexible material comprising the flexible testing chambers. Stretching of a flexible testing chamber can cause changes in testing chamber volume, whether through stretching, elastic return, or other similar factors. Such changes or inconsistencies in volume in the testing chamber cause interference with pressure readings within the testing chamber. Interference with pressure readings gathered during vacuum decay leak detection testing alter the accuracy of leak detection.

Therefore, the object of the present invention is to provide an improvement to known vacuum decay leak detection testing methods and systems that improves testing accuracy across both rigid and flexible testing chambers when an interference to testing is introduced during time that a system is not under vacuum or at low pressure conditions. Instead of trying to directly prevent or severely mitigate the exposure to such interferences, which is extremely difficult and costly, the present invention teaches a solution to the stated problem which includes adjusting raw pressure data collected from the test based on past exposure time intervals in which a testing chamber is not under vacuum or at low pressure conditions and creating a new set of pressure data to determine if a leak is present during testing.

SUMMARY OF THE INVENTION

The present invention provides an improvement on vacuum decay leak detection methods and systems. A preferred embodiment of a method for correcting for interferences introduced during time a system is not under vacuum comprises:

measuring a first time interval immediately preceding a first test cycle in which a testing chamber containing a package during the vacuum decay leak detection testing is in not under vacuum or low pressure conditions, performing the first test cycle of vacuum decay leak detection on a package, collecting raw pressure data from the first test cycle, using the measured first time interval to convert the raw pressure data to corrected pressure data to remove interference from the raw pressure data, and using the corrected pressure data to determine if a leak is present in the package.

A preferred embodiment of a system for detecting leaks in packages using vacuum decay leak detection comprises:

a testing chamber for enclosing a container to be tested such that the testing chamber is sealable from an ambient environment except for a port to which a testing system including a vacuum pump is connected, the vacuum pump being capable of creating a substantially absolute vacuum within the testing chamber in a short period of time, an absolute pressure transducer for sensing vacuum pressure within the testing chamber and conveying measured pressure to a controller, a differential pressure transducer for monitoring increases in pressure within the testing chamber after pressure within the testing chamber has fallen to a predetermined pressure as sensed by the absolute pressure transducer, a clock used to measure a time interval between each testing cycles in which the testing chamber is not under vacuum or at low pressure conditions, the clock being connected electronically to the controller such that time interval measured by the clock is conveyed to the controller as time data;

data storage electronically storing one or more sets of time data, the data storage being electronically connected to the controller, wherein the controller transforms measured pressure into corrected pressure through an algorithm that uses time data to remove one or more interferences introduced to the system between testing cycles when the testing chamber is not under vacuum or low pressure conditions, and the controller transmits the corrected pressure to a display for determining if a leak is present in a package.

Other embodiments of these processes and devices are described herein. The stated embodiments do not exclude other possible embodiments based on the teachings provided in this disclosure. A further understanding of the structural, functional, and advantageous aspects of the disclosure can be realized by reference to the following detailed description and drawings.

BRIEF DESCRIPTION OF THE DRAWINGS

A better understanding of the invention will be had with reference to the accompanying drawings wherein.

DESCRIPTION OF THE PREFERRED EMBODIMENTS

Figure 1:
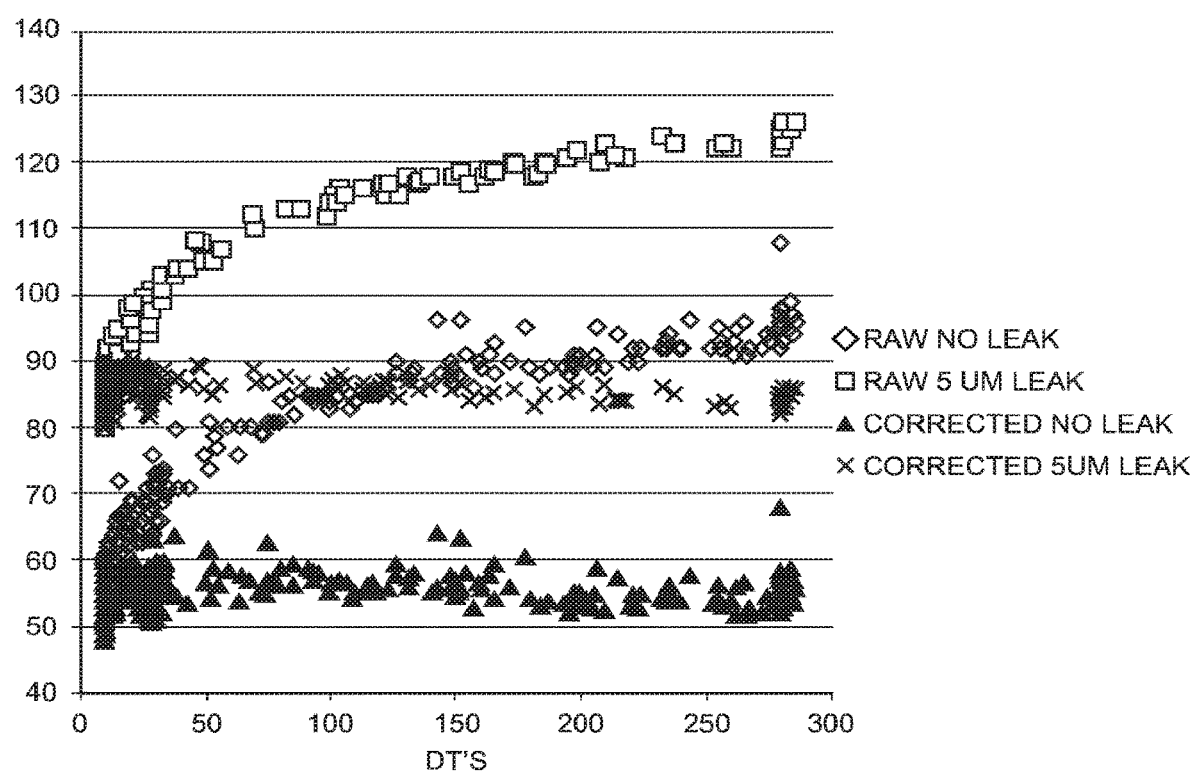
FIG. 1 is a time and pressure graph illustrating the data representations of raw leak, raw no-leak, corrected leak, and corrected no-leak data per the preferred embodiment disclosed herein.

The current invention solves the problem of interferences introduced to a testing chamber used for vacuum decay leak testing during idle time intervals wherein the testing chamber or a system is not under vacuum or low pressure conditions by measuring one or more time intervals the system is not under vacuum immediately preceding a current test, adjusting raw measured pressure gathered during the current test, and creating corrected pressure data to improve vacuum decay leak detection. It has been discovered that interferences to raw data are introduced to a leak detection system when the system in not under vacuum or low pressure conditions, and that the cumulative time in which the system is exposed to such interferences affects the severity of the impact of such interferences. By determining and using one or more time intervals immediately preceding a test cycle, it has also been discovered that the interferences introduced to raw measured data can be mitigated or removed such that a more accurate corrected data may be used to determine if a leak exists in a package.

Various embodiments and aspects of the disclosure are described with reference to details discussed below. The following descriptions and referenced drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details of vacuum decay leak testing are not described in order to provide a concise discussion of embodiments of the present disclosure.

"Interferences," as meant in this disclosure, relate to undesirable influences on leak detection data collected during vacuum decay leak detection testing. Such interferences include, but are not limited to, a build-up of moisture within a testing chamber, air trapped within the testing chamber, ambient air exposure, stretching of flexible material of the testing chamber, elastic return of flexible material of the testing chamber, introduction of foreign particles into testing chamber such as dust, etc. All such interferences act to alter pressure readings within a testing chamber by adding inconsistent testing conditions between individual tests, and can ultimately obscure leaks from being detected or falsely flag leaks as being present based on raw output pressure data. However, it is extremely difficult to determine what interferences are introduced during idle intervals or to isolate the effect of individual types of interferences on raw measured pressure data. The present invention improves the current vacuum decay leak detection technology by providing a method of testing that correct for all types of interferences by unconventionally measuring and using individual exposure time intervals to remove the effects of interferences on vacuum decay leak detection testing.

"Exposure," as meant in this disclosure, relates to a testing chamber used in vacuum decay leak detection testing being compromised by interferences due to the testing system, and specifically the testing chamber, not being under vacuum or at low pressure conditions.

While discussing the length of time a testing chamber is exposed a variety of terms may be used, such as "exposure time," "exposure intervals," "exposure time intervals," "idle intervals," and other similar expressions. All such similar terms are meant to convey the same meaning, which is an amount of time in which a vacuum decay leak detection system, and specifically a testing chamber, is not under vacuum or at low pressure conditions. Additionally, there may be more than one exposure time or interval being considered for a given embodiment.

"Consecutive," for the purposes of describing exposure times, refers to two or more exposure times each separated by a single vacuum decay leak test cycle immediately preceding a current test cycle in which raw data is being converted to corrected data. For example, if there are two consecutive exposure times, then a single test cycle of vacuum decay leak detection testing separates the two exposure times. If there are three consecutive exposure times, then a single test separates a first and second exposure time, and a second single test separates the second and a third exposure time.

For the purposes of this disclosure, two versions of data are routinely discussed. A first version of data is the data collected during known or standard vacuum decay leak detection testing without alteration or correction. This data may be referred to as "raw data," "raw pressure data," "measured raw pressure data," or similar term. A second version of data is the result of applying one or more embodiments of the invention to the raw data through the use of measured exposure time intervals. This second version of data may be referred to as "corrected data," "corrected pressure data," "measured corrected data," or similar a term.

FIG. 1 is a graphical representation of four sets of data points, as categorized in the accompanying legend. These four data points are gathered using a preferred embodiment of the invention in which two consecutive exposure intervals are used to correct measured raw data via a logarithmic algorithm. One set of data points represents raw measured pressure over time where a leak is not present (each data point represented by a diamond). A second set of data points represents raw measured pressure over time where a leak is present (each data point represented by a square). A third set of data points represents corrected measured pressure over time where a leak is not present (each data point represented by a triangle) according to a preferred embodiment of the invention. A last set of data points represents corrected measured pressure over time where a leak is present (each data point represented by an X) according to a preferred embodiment of the invention. In both sets of data points where a leak is present, the leak size is 5 micrometers. The graph shows pressure (Pa) in a testing chamber using vacuum decay leak detection testing over time (seconds).

As shown in both raw data sets of FIG. 1, the measured pressure increases as the length of time the system is not under vacuum increases. However, the rate of pressure increase over time slows exponentially to essentially zero at around 300 seconds, or five minutes, of exposure. The effect of exposure in this embodiment is therefore described as non-lineal with exponential decay. Further, exposure of ten seconds or less is not shown to have meaningful impact on the measured pressure. This creates an effective range of impactful exposure lengths between 10 and 300 seconds.

Before correcting for interference exposure, the raw data points FIG. 1 clearly show that exposure can signal false positives and/or false negatives. In previous known methods of vacuum decay leak detection, exposure time was not factored into leak detection or consistently measured. Removing time from the FIG. 1 graph would show a heavy overlap between raw measured data with and without a leak in the range of 80-100 Pa. As vacuum decay leak detection relies on sizable pressure differences between leaking and non-leaking containers, such an overlap in pressures between defective and non-defective containers prevents accurate leak testing. Even small differences in pressure between leaking and non-leaking packages would introduce a higher probability of false positives and/or false negatives.

The two corrected measured data sets of FIG. 1, however, are essentially linear, each along a shot range of pressures. The corrected measured data for a leaking container lies within a range of 80-90 Pa on the graph, while the corrected measured data for a non-leaking container lies primarily within a range of 50-60 Pa. While there are some outlier data points, none of the outlying corrected measured data points from the leak or non-leak sets overlap. The corrected sets of pressure data represent how pressure data for a package with and without a leak should appear in the absence of interferences, while the raw sets of pressure data show the impact of interferences on measured pressure data over time. FIG. 1 illustrates the improvement to vacuum decay leak detection testing technology provided by the disclosed embodiments of the invention. This improvement drastically improves the accuracy of vacuum decay leak detection testing over currently known methods and systems.

While FIG. 1 shows a non-linear the effect of exposure as non-lineal with exponential decay, it is possible to create a linear correlation through averaging the pressure increase across the range of 10-300 seconds.

A preferred embodiment of a method for correcting for interference exposure during vacuum decay leak detection testing includes performing a test cycle of vacuum decay leak detection on a package, collecting raw pressure data from the test cycle, measuring two consecutive time intervals immediately preceding the test cycle in which a testing chamber containing the package during the vacuum decay leak detection testing is in not under vacuum or low pressure conditions, using the two consecutive time intervals to convert the raw pressure data to corrected pressure data to remove interference from the raw pressure data, and using the corrected pressure data to determine if a leak is present in the package.

Instead of attempting to control inputs or the environment within a vacuum decay leak testing system to remove or compensate for highly variable and difficult to control extrinsic and intrinsic effects, the preferred embodiment adjusts and compensates the output or results of the testing cycle based on the length of time the inputs into the system were exposed to interferences. As shown in FIG. 1, between the exposure times of 10-300 second preceding the current testing cycle, the method adjusts the raw measured pressure gathered during the testing cycle more relative to the exposure time length. Therefore, raw measured pressure data gathered during a testing cycle wherein the testing chamber was exposed to interferences for 40 seconds prior to testing is adjusted less relative to a testing cycle that was exposed for 200 seconds prior to testing.

When two or more consecutive time intervals are used to convert raw pressure data into corrected pressure data, the exposure time interval that most immediately precedes a test cycle being adjusted impacts the raw measured pressure data more than the earlier exposure time intervals, followed by the next exposure time interval immediately preceding the last, and so on. Therefore, the more recent of the multiple exposure time intervals is given more weight when creating corrected pressure data.

The preferred embodiment can use an algorithm to convert raw measured pressure data into corrected pressure data. One possible algorithm that may be used in the preferred embodiment is $dP_{Corrected} = dP_{Measured} - K_{dP} * Ln(DT_{History}/10)$, wherein $DT_{History} = DT_{Current} * K_{History} + DT_{Previous} * (1 - K_{History})$. $dP_{Corrected}$ is corrected pressure data value, which is end data that will ultimately be used to determine if a leak is present. $dP_{Measured}$ is measured raw pressure value collected during the current test cycle before correcting for ambient air exposure in the testing chamber. $K_{dP}$ is an empirical correction constant. If there is no correction, such as when the exposure time interval is ten seconds or less, then $K_{dP}=0$. $DT_{History}$ is a weighted variable that factors one or more, and two in this embodiment, consecutive exposure time intervals that occurred immediately before a current test, $DT_{Current}$, and an exposure time interval that occurred before a test previous to the current test, $DT_{Previous}$. Both $DT_{Current}$ and $DT_{Previous}$ are measured by a clock or similar time keeping function with a vacuum decay leak detection testing system. $K_{History}$ is an empirical constant. If $DT_{History}$ is equal to ten seconds, then there is no correction as $(Ln(1)=0)$. If $DT_{History}$ is equal to or greater than 300 seconds, then the correction is 30-50 Pa depending on the $K_{dP}$ value. In another embodiment that mirrors the previous embodiment, $K_{History}$ has value range of 0 to 1, and $K_{dP}$ has value range 0 to 15.

While the algorithm described in the previous embodiments is logarithmic, the algorithm may alternatively be written in linear form. The algorithm may be further written in a different form of function, as long as the algorithm serves the purpose of removing interference impact on raw measured pressure data.

When practiced on a vacuum decay leak detection apparatus, the preferred embodiment of the method must be practiced on an apparatus that includes a time keeping function, such as a clock, that is at least specifically configured to measure idle time intervals or exposure time intervals between testing cycles. Further, the apparatus must have one or more structures for collecting and storing measured time intervals collected by the clock as time data, and must further include structures for utilizing the time data in converting raw measured data into corrected pressure data. As current known vacuum decay leak detection apparatuses and systems do not currently track or store individual time intervals between tests, nor are they structured to do so, embodiments of an improved vacuum decay leak detection testing system are disclosed in this description.

The preferred embodiment of the method can be practiced with either rigid or flexible testing chambers, as all embodiments of the method provide the benefit of compensating for interferences common to both types of testing chambers, such as ambient air exposure or moisture build-up, but also interferences more commonly found in or specific to flexible testing chambers, such as chamber material stretching and contracting between tests or trapped air within the testing chamber.

Another embodiment of a method for correcting for exposure during vacuum decay leak detection testing includes performing a test cycle of vacuum decay leak detection on a package, collecting raw pressure data from the test cycle, measuring a time interval immediately preceding the test cycle in which a testing chamber containing the package during the vacuum decay leak detection testing is in not under vacuum or low pressure conditions, using the time interval to convert the raw pressure data to corrected pressure data to remove interference from the raw pressure data, and using the corrected pressure data to determine if a leak is present in the package.

This embodiment is similar to the preferred embodiment, except that it uses only one time interval to adjust raw measured pressure data into corrected pressure data. While using only one time interval will not yield as precise pressure data adjustments, any adjustments it does provide would provide benefits over existing known vacuum decay leak detection methods and systems. An embodiment using only one exposure time interval has similar elements and provides similar benefits as the preferred embodiment. However, an algorithm for this embodiment would have a $DT_{Previous}$ value of 0. This embodiment is particularly useful when the current testing cycle is the first testing cycle in production series or where there is a significant gap between the previous testing cycle and the current testing cycle.

Another embodiment of a method for correcting for exposure during vacuum decay leak detection testing includes performing a test cycle of vacuum decay leak detection on a package, collecting raw pressure data from the test cycle, measuring more than two time intervals immediately preceding the test cycle in which a testing chamber containing the package during the vacuum decay leak detection testing is in not under vacuum or low pressure conditions, using the more than two time intervals to convert the raw pressure data to corrected pressure data to remove interference from the raw pressure data, and using the corrected pressure data to determine if a leak is present in the package.

This embodiment is similar to the preferred embodiment, except that this embodiment utilizes more than two, or at least three, exposure time intervals together to adjust raw measured pressure data and create corrected pressure data. There are diminishing returns on using more than two exposure time intervals, which is why the embodiment utilizing two exposure time intervals is preferred. As shown in the chart of FIG. 1, no corrected pressure points along any time overlapped between a leaking and non-leaking package test. Therefore, it is normally not optimal to input further time data from testing cycles to create even more accurate corrected pressure data. However, it is conceivable that certain packages or containers are highly sensitive to differences in pressure or some other characteristic of product or product packaging requires a finer and more precise determination of pressure differences to detect leaks. Therefore, more than two exposure time intervals can be used. In such an embodiment, an algorithm would have to include a further $DT_{Previous}$ for each exposure time interval past the second exposure time interval. Otherwise, this embodiment is similar to the preferred embodiment.

Other embodiments of the described methods are contemplated. For example, the algorithm provided to convert raw pressure data points to corrected pressure data points is logarithmic. However, the algorithm need not be logarithmic, and may be linear. As testing has determined that an exposure time interval between 10 and 300 seconds has the most varying impact on raw pressure data, it would be conceivable that a linear algorithm could be used to improve leak detection testing beyond what currently known in the field. Other variants of linear or logarithmic algorithms correcting raw data based on one or more preceding exposure time intervals are also possible.

A preferred embodiment of an improved system for vacuum decay leak detection is described. The preferred embodiment of a vacuum decay leak detection testing system includes a testing chamber for enclosing a container to be tested such that the testing chamber is sealed from an ambient environment except for a port to which a testing system including a vacuum pump is connected, the vacuum pump being capable of creating a substantially absolute vacuum within the testing chamber in a short period of time, an absolute pressure transducer for sensing vacuum pressure within the testing chamber and conveying measured pressures to a controller, a differential pressure transducer for monitoring increases in pressure within the testing chamber after pressure within the testing chamber has fallen to a predetermined pressure as sensed by the absolute pressure transducer, a clock, stop watch, or similar time-keeping sensor used to collect time data which is time measured during idle intervals between testing cycles in which the testing chamber is not under vacuum or at low pressure conditions, the clock being connected electronically to the controller such that time data measured by the clock is conveyed to the controller and/or a data storage, the data storage electronically connected to the controller which stores consecutive sets of time data measuring time intervals between testing in which the testing chamber is not under vacuum or at low pressure conditions, wherein the controller transforms measured pressures into corrected pressures by using an algorithm that considers time data immediately preceding a current test cycle to remove interferences, and the controller transmits the corrected pressure to a display for determining if a leak is present in a package.

The controller can be a processor, microprocessor, or similar computer processing device. The controller is at least electronically connected to the clock, data storage, and the display, such that the controller receives time data from the clock, transmits or received time data from the data storage, converts raw measured pressure data gathered during the testing cycle to corrected pressure data utilizing one or more algorithms, and transmits the corrected pressure data to the display.

Multiple embodiments of an improved system are possible, wherein each embodiment utilizes a different number of measured time data preceding a current test. One set of time data immediately preceding the current test is necessary. Any number of preceding time data sets greater than one may be used to more precisely remove interferences from the measured pressure data. However, there are diminishing returns on the preciseness of the removed interference, such that the industrial utility of using more than several sets of time data is negligible. Therefore, several embodiments of the system are contemplated wherein a separate embodiment uses one, two, and three sets of preceding time data immediately preceding a current test. For the embodiments using two and three sets of time data, the sets are consecutive.

One or more consecutive sets of time data may be stored within the data storage such that the time data for an extended time period, such as a day, a week, or a month's worth of time data may be stored to help better predict and correct for interferences in the measured pressure data.

Another embodiment of an improved system includes using an algorithm using two consecutive time intervals to convert the raw pressure data to corrected pressure data to remove interference from the raw pressure data, wherein $DT_{Previous}$ is a first time of the two consecutive time intervals and $DT_{Current}$ is a second time of the two consecutive time intervals, the corrected data being a data set of raw pressure data points collected over a testing time interval and converted to corrected data points wherein each raw pressure data point ($dP_{Measured}$) is converted to corrected pressure data ($dP_{Corrected}$) using $dP_{Corrected}=dP_{Measured}-K_{dP}*Ln(DT_{History}/10)$, wherein $DT_{History}=DT_{Current}*K_{History}+DT_{Previous}*(1-K_{History})$, wherein $K_{History}$ and $K_{dP}$ are constants, and using the corrected pressure data set to determine if a leak is present in the package.

Another embodiment of an improved system is essentially the same as the previous embodiment, wherein that $K_{History}$ has value range of 0 to 1, and $K_{dP}$ has value range 0 to 15.

Further embodiments of an improved system are contemplated. For example, the algorithm provided in a previous embodiment to convert raw pressure data points to corrected pressure data points is logarithmic. However, the algorithm need not be logarithmic, and instead may be linear. As testing has determined that an exposure time interval between 10 and 300 seconds has the most varying impact on raw pressure data, a linear algorithm may be used to improve leak detection testing beyond what is currently known in the field. Other variants of linear or logarithmic algorithms correcting raw data based on one or more preceding exposure time intervals are also possible.

It is important to note that while an algorithm converts raw data to corrected data on a one-to-one basis (i.e. one raw pressure value to one corrected pressure value), the correction of raw data is continuous throughout the length of the testing cycle. As pressure is continuously measured throughout vacuum decay leak testing, so too is it necessary to continuously correct the raw measured data gathered by the system. Therefore, the described algorithm and any other algorithm used to correct raw pressure data as provided by a system or method described herein is continually applied to each new raw pressure data point gathered during testing to provide pressure differentials over time as required by vacuum decay leak detection. Further, the algorithm of methods and systems described herein can be a software program installed in or run by controller.

Figures 2, 3:
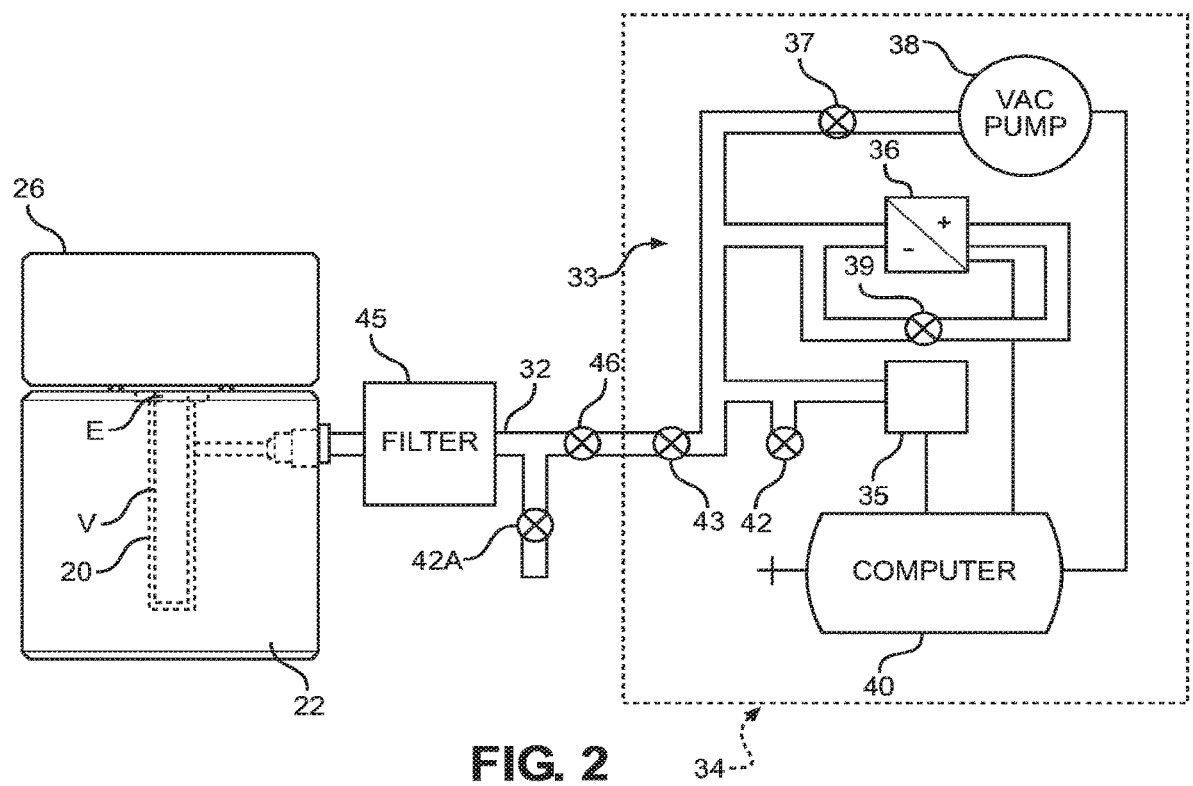
FIG. 2 is a diagram of an embodiment of a vacuum decay leak detection system.
FIG. 3 is a diagram of two consecutive leak detection tests per the described embodiments, which further illustrates how collected and stored time data are applied in the algorithm.

FIG. 2 shows a known vacuum decay leak detection system, wherein test system 33 within the controller 34 includes an absolute vacuum pressure transducer 35 and a differential pressure transducer 36, both of which are in communication with the suction conduit 32 and a downstream vacuum pump 38. A first valve 37 is placed between the transducers and the vacuum pump for closing the vacuum pump from the vacuum conduit when a first test pressure, which in some tests may be approximately absolute vacuum pressure, is achieved within the testing chamber following a stepped sequence as explained below. The closing of the first valve to close the test system from the vacuum pump is controlled by a processor 40 in response to signals received from the absolute vacuum pressure transducer 35 that pressures within the testing chamber and along the vacuum conduit are at a predetermined level within one or more predetermined time periods. Following the initial period(s), a very short time period is given to allow the system to equalize after closing a second valve 39 between the differential pressure transducer and a reference source. Thereafter, during a final test time, as measured in seconds, a differential pressure test is conducted wherein the differential pressure transducer monitors the pressure within the testing chamber to determine if there is any pressure increase that would reflect a small leak in the container or vial. During the final test period, the absolute pressure transducer also monitors the pressure in the testing chamber to provide confirming data.

In order to prevent contamination of the test equipment, a hydrophobic or other filter 45 may be placed along the vacuum conduit 32. This is particularly important if a container under test has a large leak that could damage the equipment. Also, after "failed" tests, and especially after tests aborted before completion due to large leaks, following removal of the leaking packages and any disposable test chamber inserts, a flushing of the testing chamber and vacuum conduits is conducted in order to remove contaminant gas and liquids from the testing chamber. As further shown in FIG. 2, to protect the components of the testing system 33 of the controller from contaminants, the computer 40 controls opening and closing of an emergency shut off valve 41 and also a vent valve 42 that is provided to purge or vent the test system of the controller. The shut off valve 41 is operable upon detection of a large or gross leak in a container to thereby prevent contaminants from entering the testing system 33. In some embodiments of the invention, a separate vent valve 42A may be used after each test to vent the testing chamber 20 as a container is being removed therefrom. In other embodiments, the testing chamber is vented simply upon opening of the chamber to remove a tested container. The isolation valve 43 is also operable by the controller in a manner of an emergency valve to close the testing system to prevent contaminants from affecting the components of the system. A separate emergency valve, such as 41 of FIG. 2 may be used in other systems intermediate the isolation valve 43 and the testing chamber 20.

The preferred embodiment of the system can be achieved by modifying the system shown in FIG. 2 to include a clock, stopwatch, or similar time-keeping sensor electronically connected to the computer 40, wherein the computer 40, or controller, is at least electronically connected to the clock, a data storage, and a display, such that the controller receives time data from the clock, transmits or received time data from the data storage, converts raw measured pressure data gathered during the testing cycle to corrected pressure data utilizing one or more algorithms, and transmits the corrected pressure data to the display. The display may show the corrected pressure data in graphical form, as in FIG. 1, in numerical form, or simply provide a pass/fail determination in the form of two corresponding sounds, lights, or similar communication.

FIG. 3 demonstrates how consecutive time intervals are used by described method or system embodiments using two consecutive time intervals to generate corrected pressure data. A first test will use the most recent time data (Time B) gathered for the $DT_{Current}$ value and will use the time data (Time A) from the immediately preceding test for the $DT_{Previous}$. Upon completing the first time, and upon further exposure to interferences, the processor will collect and store another time set (Time C) that will be used as $DT_{Current}$ value for a second test. Time B will now be used for the $DT_{Previous}$ value in the second test. This process repeats for each successive time. When performing an initial test, the $DT_{Previous}$ value will either be 10 seconds if the testing chamber was previously cleaned of ambient air exposure and stored sealed or the value will be 300 seconds if the testing chamber was stored exposed to interferences.

We claim:

1. A method for correcting for exposure during vacuum decay leak detection testing comprising:
    measuring a first time interval immediately preceding a first test cycle of vacuum decay leak detection testing, the first time interval being a time in which a testing chamber containing a package is in not under vacuum or low pressure conditions,
    performing the first test cycle of vacuum decay leak detection on a package,
    collecting raw pressure data from the first test cycle,
    using the measured first time interval to convert the raw pressure data to corrected pressure data to remove interference from the raw pressure data, and
    using the corrected pressure data to determine if a leak is present in the package.

2. The method of claim 1, further comprising using a second time interval immediately preceding a second testing cycle which immediately precedes the first test cycle in combination with the first time interval to further remove interference from the raw pressure data.

3. The method of claim 2, further comprising using a third time interval immediately preceding a third testing cycle which immediately precedes the second test cycle in combination with the first time interval and the second time interval to further remove interference from the raw pressure data.

4. The method of claim 2, wherein an algorithm is used to convert the measured pressure data into corrected pressure data based on the first measured time interval.

5. The method of claim 4, wherein the algorithm is $dP_{Corrected} = dP_{Measured} - K_{dP} * Ln(DT_{History}/10)$, wherein $DT_{History} = DT_{Current} * K_{History} + DT_{Previous} * (1 - K_{History})$.

6. The method of claim 1, wherein an algorithm is used to convert the measured pressure data into corrected pressure data based on the first measured time interval.

7. The method of claim 6, wherein the algorithm is logarithmic.

8. The method of claim 6, wherein the algorithm is linear.

9. The method of claim 6, wherein the algorithm is $dP_{Corrected} = dP_{Measured} - K_{dP} * Ln(DT_{History}/10)$, wherein $DT_{History} = DT_{Current} * K_{History} + DT_{Previous} * (1 - K_{History})$.

10. A system for improved vacuum decay leak detection testing, comprising:
    a testing chamber for enclosing a container to be tested such that the testing chamber is sealable from an ambient environment except for a port to which a testing system including a vacuum pump is connected, the vacuum pump being capable of creating a substantially absolute vacuum within the testing chamber in a short period of time, an absolute pressure transducer for sensing vacuum pressure within the testing chamber and conveying measured pressure to a controller, a differential pressure transducer for monitoring increases in pressure within the testing chamber after pressure within the testing chamber has fallen to a predetermined pressure as sensed by the absolute pressure transducer, a clock used to measure a time interval between each testing cycles in which the testing chamber is not under vacuum or at low pressure conditions, the clock being connected electronically to the controller such that time interval measured by the clock is conveyed to the controller as time data;

data storage electronically storing one or more sets of time data, the data storage being electronically connected to the controller, wherein the controller transforms measured pressure into corrected pressure through an algorithm that uses time data to remove one or more interferences introduced to the system between testing cycles when the testing chamber is not under vacuum or low pressure conditions, and the controller transmits the corrected pressure to a display for determining if a leak is present in a package.

11. The system of claim 10, wherein the algorithm is linear.

12. The system of claim 10, wherein the algorithm is logarithmic.

13. The system of claim 10, wherein the algorithm is $dP_{Corrected} = dP_{Measured} - K_{dP}*Ln(DT_{History}/10)$, wherein $DT_{History} = DT_{Current}*K_{History} + DT_{Previous}*(1-K_{History})$.

14. The system of claim 10, wherein the time data comprises a time interval immediately preceding a current test in which the system is not under vacuum or low pressure conditions.

15. The system of claim 14, wherein the algorithm is $dP_{Corrected} = dP_{Measured} - K_{dP}*Ln(DT_{History}/10)$, wherein $DT_{History} = DT_{Current}*K_{History} + DT_{Previous}*(1-K_{History})$.

16. The system of claim 10, wherein the time data comprises two time intervals immediately preceding a current test in which the system is not under vacuum or low pressure conditions.

17. The system of claim 16, wherein the algorithm is $dP_{Corrected} = dP_{Measured} - K_{dP}*Ln(DT_{History}/10)$, wherein $DT_{History} = DT_{Current}*K_{History} + DT_{Previous}*(1-K_{History})$.

18. The system of claim 10, wherein the time data comprises three time intervals immediately preceding a current test in which the system is not under vacuum or low pressure conditions.

19. The system of claim 18, wherein the algorithm is $dP_{Corrected} = dP_{Measured} - K_{dP}*Ln(DT_{History}/10)$, wherein $DT_{History} = DT_{Current}*K_{History} + DT_{Previous}*(1-K_{History})$.

* * * * *